US009357412B2

(12) United States Patent
Tachikawa (10) Patent No.: US 9,357,412 B2
(45) Date of Patent: May 31, 2016

(54) COMMUNICATION CONTROL METHOD AND BASE STATION (71) Applicant: KYOCERA CORPORATION, Kyoto (JP)

(72) Inventor: Hitoya Tachikawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/386,060

(22) PCT Filed: Mar. 21, 2013

(86) PCT No.: PCT/JP2013/058142
§ 371 (c)(1),
(2) Date: Sep. 18, 2014

(87) PCT Pub. No.: WO2013/141320
PCT Pub. Date: Sep. 26, 2013

(65) Prior Publication Data
US 2015/0079910 A1 Mar. 19, 2015

Related U.S. Application Data (60) Provisional application No. 61/614,300, filed on Mar. 22, 2012.

(51) Int. Cl.
H04W 4/00 (2009.01)
H04W 24/08 (2009.01)
H04W 24/10 (2009.01)
H04W 92/20 (2009.01)

(52) U.S. Cl.
CPC .............. *H04W 24/08* (2013.01); *H04W 24/10* (2013.01); *H04W 92/20* (2013.01)

(58) Field of Classification Search
CPC ...... H04W 24/08; H04W 24/10; H04W 92/20
See application file for complete search history.

(56) References Cited

U.S. PATENT DOCUMENTS

2010/0039951 A1* 2/2010 She et al. ................... 370/252
2011/0189988 A1* 8/2011 Morimoto et al. ......... 455/422.1
2011/0211471 A1 9/2011 Yabe et al.
2012/0218966 A1* 8/2012 Yamazaki et al. .......... 370/329
(Continued)

FOREIGN PATENT DOCUMENTS

JP H09-161177 A 6/1997
JP 2009-049742 A 3/2009
(Continued)

OTHER PUBLICATIONS

International Search Report; PCT/JP2013/058142; Jun. 18, 2013.
(Continued)

*Primary Examiner* — Erin File
(74) *Attorney, Agent, or Firm* — Studebaker & Brackett PC (57) ABSTRACT A communication control method that is applied to a mobile communication system including an X2 interface established between a first base station and a second base station, comprises: a step A of transmitting, by the first base station, a first X2 message to the second base station through the X2 interface. In the step A, the first base station adds first measurement information for measuring communication delay between the first base station and the second base station to the first X2 message, and transmits the first X2 message.

16 Claims, 9 Drawing Sheets (56) References Cited

U.S. PATENT DOCUMENTS

2013/0201966 A1* 8/2013 Weng et al. .................. 370/336
2013/0244659 A1* 9/2013 Murasawa .................... 455/436
2015/0098441 A1* 4/2015 Peng ............................. 370/330

FOREIGN PATENT DOCUMENTS

| JP | 2011-097571 A | 5/2011 |
| JP | 2011-109165 A | 6/2011 |
| WO | 2010/032318 A1 | 3/2010 |

OTHER PUBLICATIONS

3GPP TS 36.300 V11.0.0 (Dec. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11).

An Office Action; "Notice of Reasons for Rejection," issued by the Japanese Patent Office on Oct. 6, 2015, which corresponds to Japanese Patent Application No. 2014-506281 and is related to U.S. Appl. No. 14/386,060; with English language statement of relevance.

* cited by examiner

COMMUNICATION CONTROL METHOD AND BASE STATION

TECHNICAL FIELD

The present invention relates to a communication control method and a base station in a mobile communication system.

BACKGROUND ART

In LTE (Long Term Evolution) and LTE-Advanced designed by 3GPP (3rd Generation Partnership Project) which is a project aiming to standardize a mobile communication system, an "X2 interface", which is a network interface established between base stations, is defined (for example, refer to Non-patent Document 1).

The X2 interface is used for inter-base station communication in a handover procedure of a user terminal and CoMP (Coordinated Multipoint Transmission) in which a plurality of base stations communicate with a user terminal in cooperation with each other.

PRIOR ART DOCUMENT

Non-Patent Document

[Non-patent Document 1] 3GPP technology specification "TS 36.300 V11.0.0" December, 2011

SUMMARY OF THE INVENTION

For the handover procedure and the CoMP, inter-base station communication with high reliability is required. However, since a small base station such as a home base station installed within the house may be connected to a user line and has low processing capability, it is difficult to estimate communication delay in inter-base station communication. Thus, it is difficult to improve the reliability of the inter-base station communication.

Therefore, an object of the present invention is to provide a communication control method and a base station with which it is possible to improve the reliability of inter-base station communication.

The present invention has following features in order to solve the aforementioned problems.

A communication control method according to the present invention is a method that is applied to a mobile communication system including an X2 interface. The communication control method comprises: a step A of transmitting, by a first base station, a first X2 message to a second base station through an X2 interface established between a first base station and a second base station, wherein in the step A, the first base station adds first measurement information for measuring communication delay between the first base station and the second base station to the first X2 message, and transmits the first X2 message.

The communication control method may further comprise: a step B of transmitting, by the second base station, a second X2 message to the first base station through the X2 interface in response to reception of the first X2 message, wherein in the step B, on the basis of the first measurement information included in the first X2 message, the second base station adds second measurement information for measuring the communication delay to the second X2 message, and transmits the second X2 message.

The communication control method may further comprise: a step C of receiving, by the first base station, the received second X2 message, and calculating the communication delay on the basis of the second measurement information added to the second X2 message.

The first measurement information and/or the second measurement information may include information indicating a scheme of time synchronization in a transmission source base station.

In a first measurement mode, the first measurement information may include a transmission time of the first X2 message, and in the first measurement mode, the second measurement information may include a reception time of the first X2 message and a transmission time of the second X2 message.

In a second measurement mode, the first measurement information may include dummy data having a data length determined by the first base station, and in the second measurement mode, the second measurement information may include data corresponding to the dummy data.

The communication control method may further comprise: a step D of selecting, by the first base station, the first measurement mode or the second measurement mode in response to a type of the first X2 message.

The communication control method may further comprise: a step E of switching, by the first base station, to the first measurement mode when the communication delay calculated in the step C exceeds a threshold value in the second measurement mode.

The communication control method may further comprise: a step F of applying, by the first base station, the second measurement mode during an operation of the X2 interface after applying the first measurement mode in initial setup of the X2 interface.

The first X2 message may be a request message for handover of a user terminal from the first base station to the second base station, the second X2 message may be a response message for the request message, and the communication control method may further comprise: a step G of stopping, by the first base station, the handover when the communication delay calculated in the step C exceeds a threshold value.

The first X2 message may be a request message for cooperative communication between the first base station and the second base station, the second X2 message may be a response message for the request message, and the communication control method may further comprise: a step H of stopping, by the first base station, the cooperative communication when the communication delay calculated in the step C exceeds a threshold value.

A base station according to the present invention is a base station that has an X2 interface established between the base station and another base station. The base station comprises: transmission unit that transmits a first X2 message to the other base station through the X2 interface, wherein the transmission unit adds first measurement information for measuring communication delay between a first base station and a second base station to the first X2 message, and transmit the first X2 message.

MODES FOR CARRYING OUT THE INVENTION

Hereinafter, embodiments of the present invention will be described with reference to the accompanying drawings.

(1) Overview of Mobile Communication System

Figure 1:
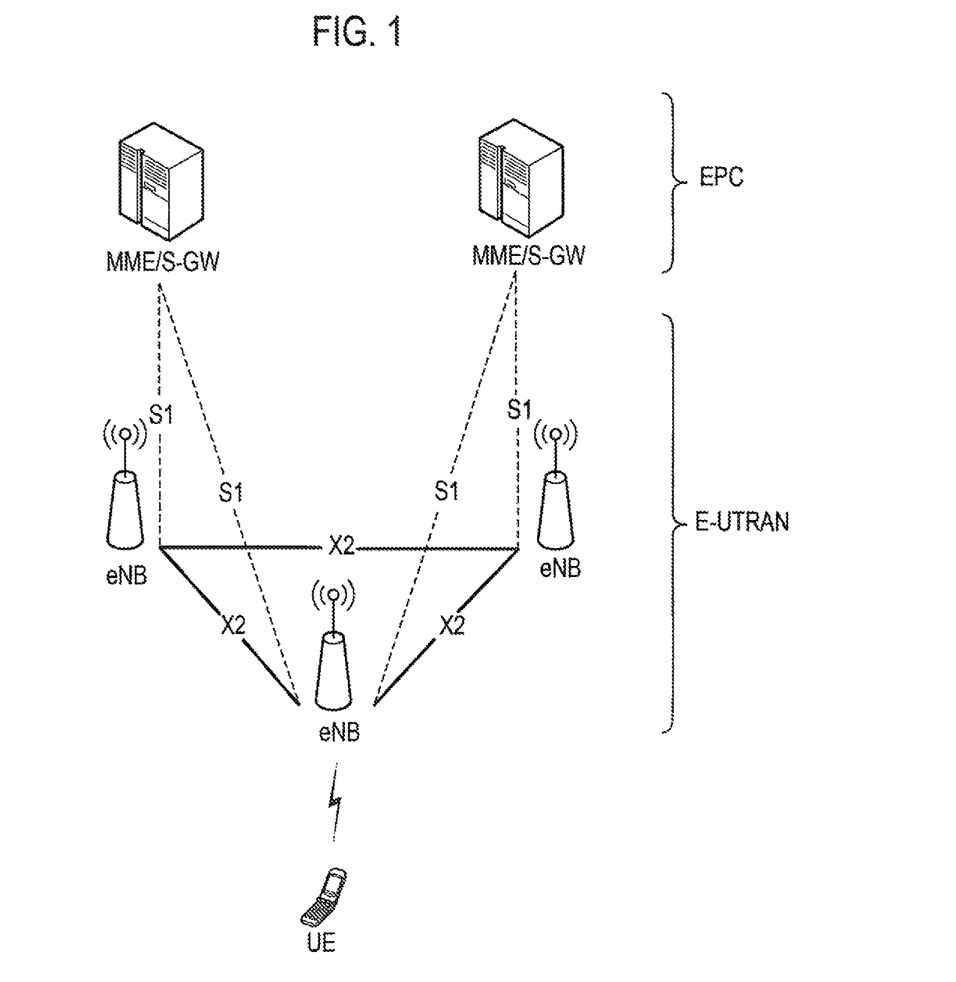
FIG. 1 is a configuration diagram of a mobile communication system according to an embodiment.

FIG. 1 is a configuration diagram of a mobile communication system (an LTE system) according to the present embodiment.

As illustrated in FIG. 1, the mobile communication system according to the present embodiment includes UE (User Equipment), E-UTRAN (Evolved-UMTS Terrestrial Radio Access Network), and EPC (Evolved Packet Core).

The UE is a mobile radio communication device and corresponds to a user terminal. The UE performs radio communication with a cell (called a "serving cell"), with which a connection is established, in a connected state corresponding to a state during communication. The process of changing the serving cell of the UE is called handover.

The E-UTRAN includes a plurality of eNBs (evolved Node-Bs). The eNB is a stationary radio communication device that performs radio communication with the UE, and corresponds to a base station. Each eNB includes one cell or a plurality of cells. The eNB, for example, has a radio resource management (RRM) function, a routing function of user data, and a measurement control function for mobility control and scheduling.

The EPC includes MME (Mobility Management Entity) and S-GW (Serving-Gateway). The EPC corresponds to a core network. The MME is a network device that performs various types of mobility control and the like for the UE, and corresponds to a control station. The S-GW is a network device that performs transfer control of user data and corresponds to a switching center.

Between eNBs, an X2 interface, which is a logical communication channel between base stations, is established. Furthermore, each eNB is connected to the EPC (MME and S-GW) through an S1 interface that is a logical communication channel with the EPC.

Figure 2:
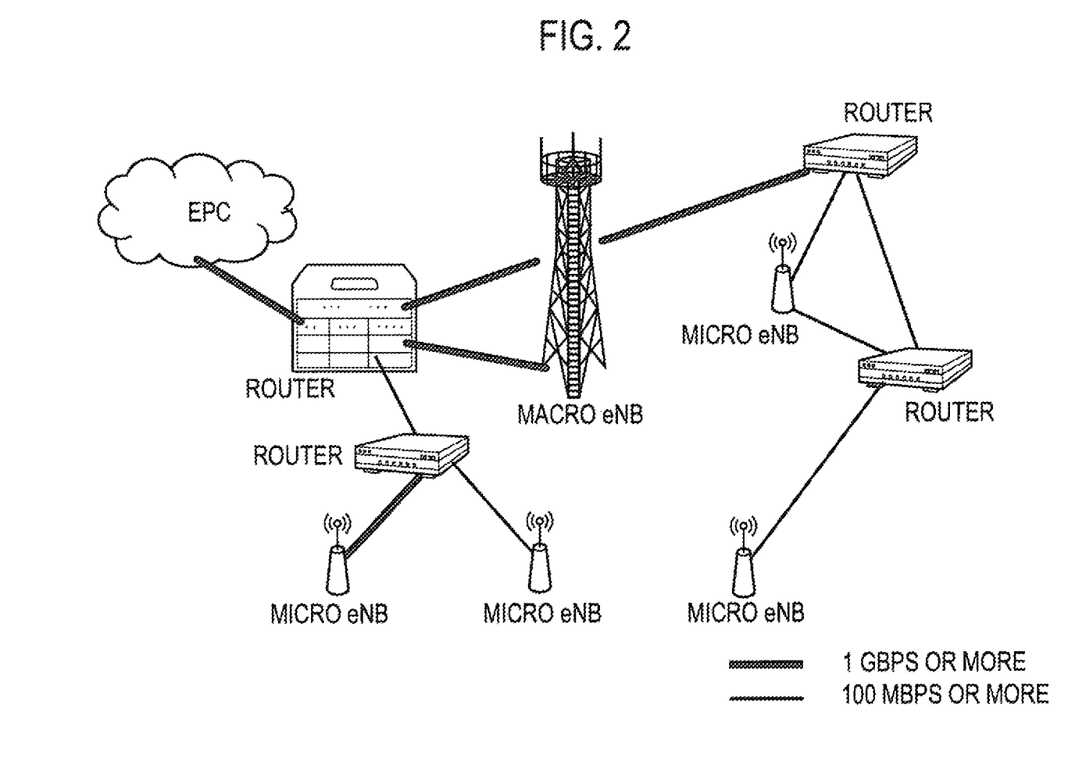
FIG. 2 is a diagram illustrating a detailed example of a communication environment of the mobile communication system according to the embodiment.

FIG. 2 is a diagram illustrating a detailed example of a communication environment of the mobile communication system according to the present embodiment.

As illustrated in FIG. 2, micro eNBs including a small cell (a micro cell) are installed in the vicinity of a macro eNB including a large cell (a macro cell).

The eNBs are physically connected through routers included in a backhaul line. As described above, since physical communication channels between the eNBs are different in response to installation situations of the eNBs and the routers, variation occurs in a communication speed between the eNBs. As a consequence, variation also occurs in a communication speed of the aforementioned X2 interface.

Furthermore, each eNB is time-synchronous. However, schemes for time synchronization (hereinafter, "time synchronization schemes") are not unified in the eNBs. The time synchronization scheme, for example, includes GPS (Global Positioning System), IEEE 1588, and NTP (Network Time Protocol).

Figure 3:
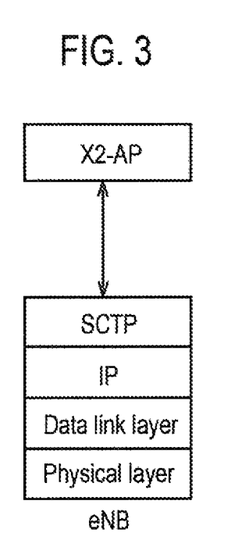
FIG. 3 is a protocol stack diagram of an X2 interface according to the embodiment.

FIG. 3 is a protocol stack diagram of the X2 interface.

As illustrated in FIG. 3, for a control plane dealing with control information, the eNB includes a layer 1 (a physical layer), a layer 2 (a data link layer), and IP (Internet Protocol) as a layer 3 (a network layer) provided on the data link layer. Furthermore, the eNB includes SCTP (Stream Control Transmission Protocol) provided on the IP, and X2-AP (X2 Application Protocol) provided on the SCTP. The X2-AP performs a handover-related process, a process of controlling inter-base station interference, and the like.

For example, as the handover-related process, the X2-AP transmits/receives a handover request (Handover Request) message, a handover response (Handover Request ACK/NACK) message, and the like. Furthermore, as the process of controlling inter-base station interference, the X2-AP transmits/receives a Load Indication message including interference control information. For details of the X2-AP, for example, refers to 3GPP technology specifications "TS 36.423 V10.1.0".

Figure 4:
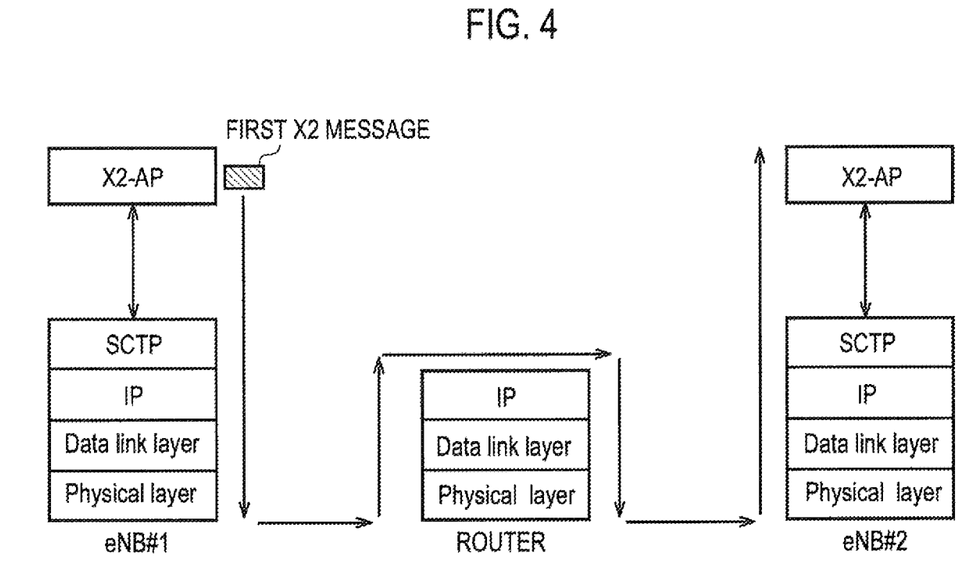
FIG. 4 is a diagram (part 1) for explaining an operation in which eNB #1 (a first base station) and eNB #2 (a second base station) perform inter-eNB communication through the X2 interface according to the embodiment.
Figure 5:
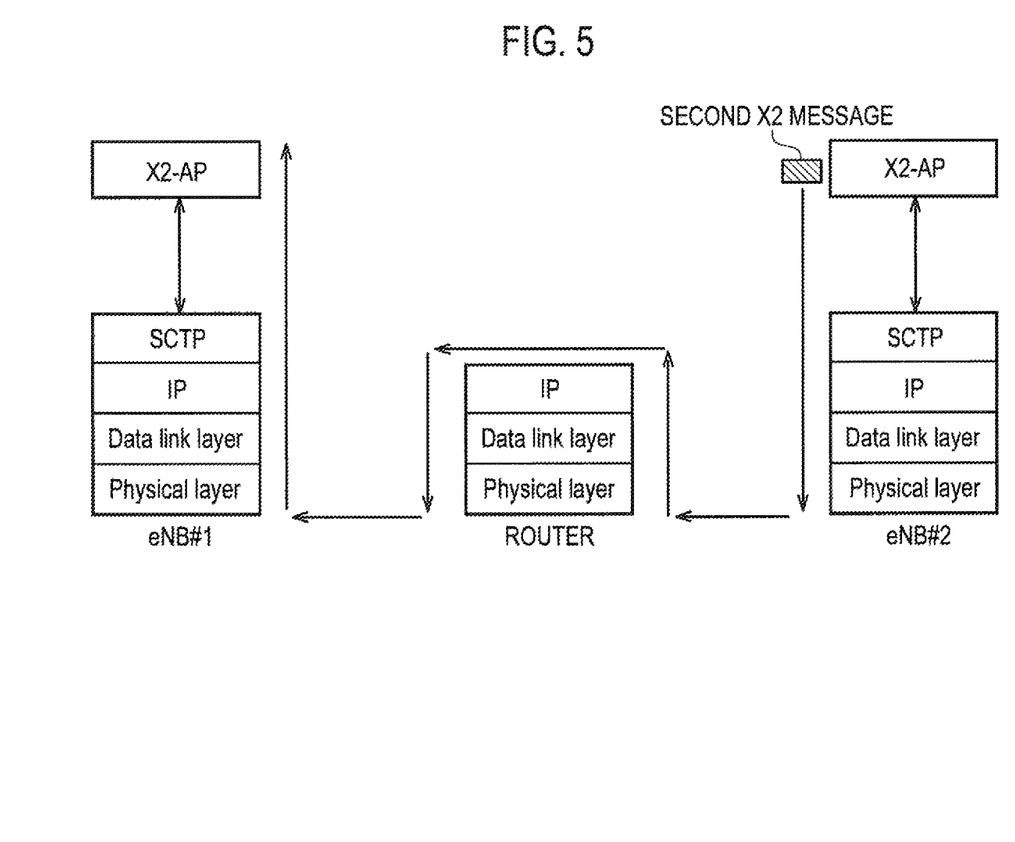
FIG. 5 is a diagram (part 2) for explaining an operation in which the eNB #1 (the first base station) and the eNB #2 (the second base station) perform the inter-eNB communication through the X2 interface according to the embodiment.

FIG. 4 and FIG. 5 are diagrams for explaining operations in which eNB #1 (a first base station) and eNB #2 (a second base station) perform inter-eNB communication through the X2 interface.

As illustrated in FIG. 4, the X2-AP of the eNB #1 generates a first X2 message for the eNB #2. The eNB #1 transmits the first X2 message through the SCTP, the IP, the data link layer, and the physical layer.

A router provided on a communication channel between the eNB #1 and the eNB #2 routes the first X2 message from the eNB #1 using IP through a physical layer and a data link layer, and relays the first X2 message to the eNB #2 through the physical layer and the data link layer again.

The X2-AP of the eNB #2 receives and interprets the first X2 message, which is relayed by the router, through the physical layer, the data link layer, the IP, and the SCTP. Then, the eNB #2 performs a process corresponding to the first X2 message.

As illustrated in FIG. 5, the X2-AP of the eNB #2 generates a second X2 message for the eNB #1 in response to a result of the process corresponding to the first X2 message. The eNB #2 transmits the second X2 message through the SCTP, the IP, the data link layer, and the physical layer.

The router provided on the communication channel between the eNB #1 and the eNB #2 routes the second X2 message from the eNB #2 using IP through the physical layer and the data link layer, and relays the second X2 message to the eNB #1 through the physical layer and the data link layer again.

The X2-AP of the eNB #1 receives the second X2 message, which was relayed by the router, through the physical layer, the data link layer, the IP, and the SCTP, and performs a process corresponding to the second X2 message.

Figure 6:
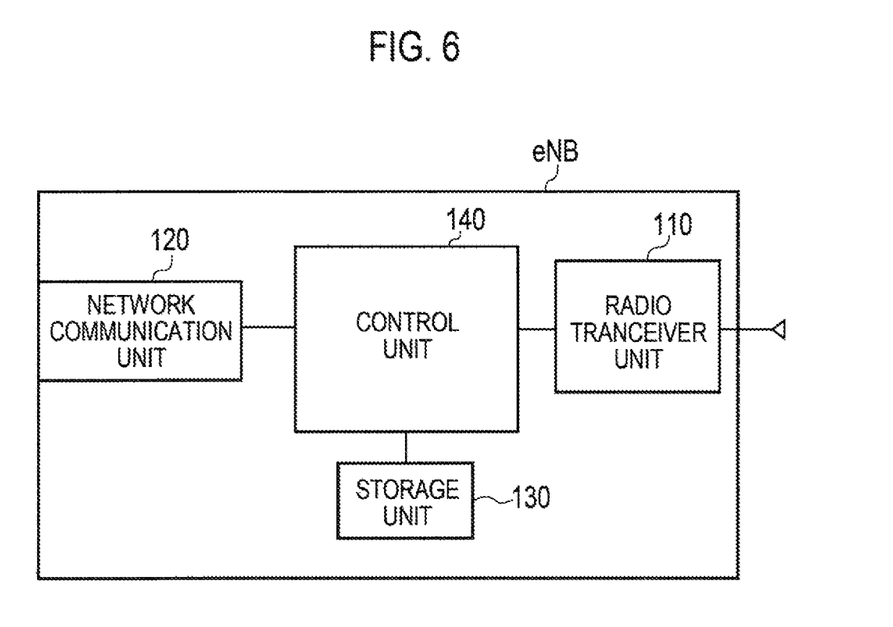
FIG. 6 is a block diagram of eNB according to the embodiment.

FIG. 6 is a block diagram of the eNB. As illustrated in FIG. 6, the eNB includes a radio transceiver unit 110, a network communication unit 120, a storage unit 130, and a control unit 140.

The radio transceiver unit 110 transmits/receives a radio signal. Furthermore, the radio transceiver unit 110 forms one cell or a plurality of cells.

The network communication unit 120 performs inter-base station communication with another eNB through the X2 interface. Furthermore, the network communication unit 120 communicates with the EPC through the S1 interface.

The storage unit 130 stores various types of information that is used for the control by the control unit 140. The control unit 140 controls various functions of the eNB.

(2) Measurement Information

As described above, the eNB #1 transmits the first X2 message to the eNB #2 through the X2 interface. The eNB #2 transmits the second X2 message to the eNB #1 through the X2 interface.

In the present embodiment, communication delay (round-trip delay) between the eNB #1 and the eNB #2 is measured using the X2 message transmitted/received through the X2 interface. In addition, the "communication delay" includes a delay time (that is, network delay) in a network (a communication channel) and a processing time (that is, processing delay) of a communication partner.

A basic procedure for measuring the communication delay is as follows.

Firstly, the eNB #1 adds first measurement information for measuring communication delay between the eNB #1 and the eNB #2 to the first X2 message, and transmits the first X2 message.

Secondly, in response to the reception of the first X2 message with the first measurement information, the eNB #2 adds second measurement information for measuring the communication delay to the second X2 message, and transmits the second X2 message.

Thirdly, after the second X2 message is received, the eNB #1 calculates the communication delay on the basis of the second measurement information added to the second X2 message.

In addition, in order to measure the communication delay (round-trip delay) between the eNB #1 and the eNB #2, it is necessary to transmit the first X2 message from the eNB #1 to the eNB #2, and to transmit the second X2 message from the eNB #2 to the eNB #1 as a response for the first X2 message. Thus, when the first X2 message is a type of X2 messages (for example, a handover request message and the like) for requesting a response from the eNB #2, it is preferable to add the first measurement information to the first X2 message.

Figure 7:
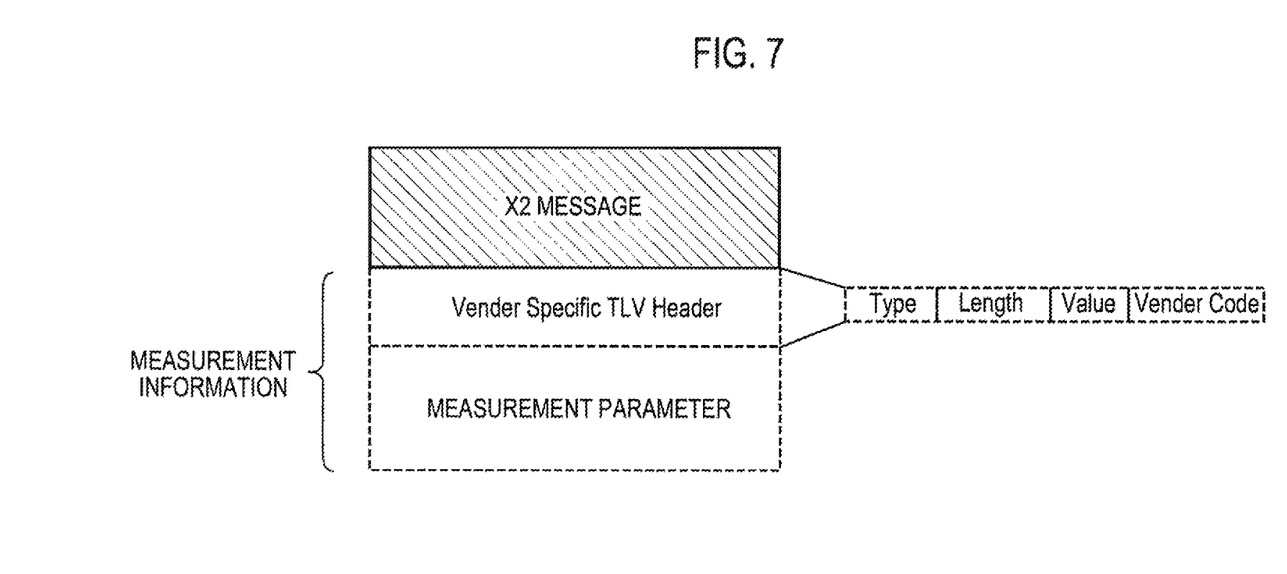
FIG. 7 is a diagram for explaining an overview of measurement information according to the embodiment.

FIG. 7 is a diagram for explaining an overview of the measurement information.

As illustrated in FIG. 7, the measurement information (the first measurement information and the second measurement information) is added to the X2 message. Furthermore, the measurement information is provided in a variable length format of a TLV (Type-Length-Value) format. For example, the measurement information includes a TLV header and a measurement parameter.

In the present embodiment, as a format of the measurement information, two types of formats corresponding to two types of measurement modes are defined.

The first measurement mode is a "detail measurement mode" capable of measuring even a response processing capability of a communication partner (eNB) in detail. The format of the measurement information used in the detail measurement mode is called a "format for the detail measurement mode".

The second measurement mode is a "simple measurement mode" capable of simply measuring a round-trip time. The format of the measurement information used in the simple measurement mode is called a "format for the simple measurement mode".

(2.1) Format for Detail Measurement Mode

Figure 8:
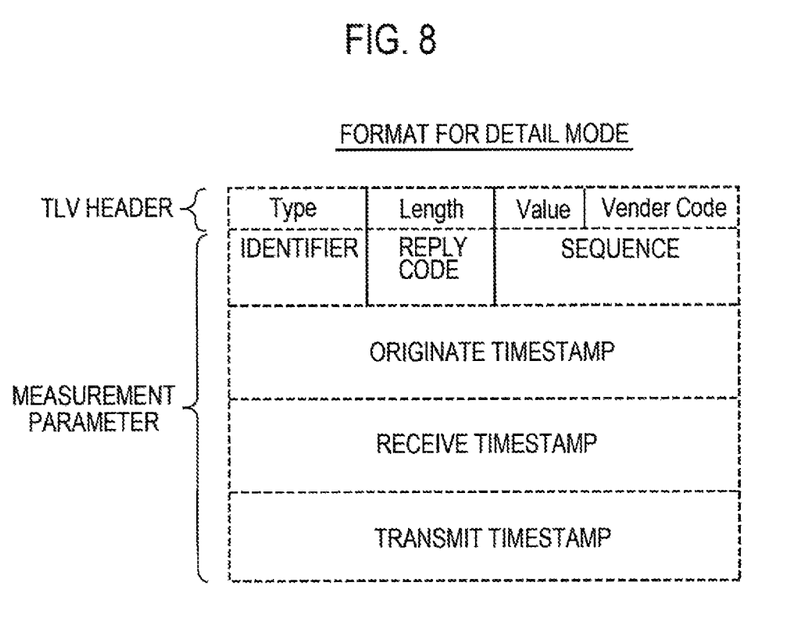
FIG. 8 is a format diagram of a format for a detail measurement mode according to the embodiment.

FIG. 8 is a format diagram of the format for the detail measurement mode.

As illustrated in FIG. 8, a TLV header (a Vender Specific TLV Header) includes fields of "Type", "Length", "Value", and "Vender code".

The field "Type" stores information indicating a request (Request) or a response (Response). The field "Type" of the aforementioned first measurement information stores the information indicating the request (Request), and the field "Type" of the aforementioned second measurement information stores the information indicating the response (Response).

The field "Length" stores information indicating the entire length of the measurement information.

The field "Value" is not used in the present embodiment.

The field "Vender code" stores a code of a body that determines a standard, or stores information for distinction such as the purpose of a test.

The measurement parameter includes fields of "Identifier", "Reply Code", "Sequence", "Original Timestamp", "Receive Timestamp", and "Transmit Timestamp".

The field "Identifier" stores a unique value (for example, an identifier of a transmission source) when the transmission source transmits the Request (the first measurement information). In the present embodiment, when transmitting the first measurement information together with the first X2 message, the eNB #1 stores the identifier of the eNB #1 in the field "Identifier". In this way, the eNB #2 is able to designate the eNB #1 as a response destination.

The field "Reply Code" stores information (for example, GPS/IEEE 1588/NTP/others) indicating a time synchronization method. In the present embodiment, when transmitting the first measurement information together with the first X2 message, the eNB #1 stores information indicating the time synchronization scheme of the eNB #1 in the field "Reply Code". When transmitting the second measurement information together with the second X2 message, the eNB #2 stores information indicating the time synchronization scheme of the eNB #2 in the field "Reply Code".

The field "Sequence" stores a unique value when the transmission source transmits the Request (the first measurement information). When the transmission destination replies Response to the transmission source, a value is replied without a change. In this way, the transmission source is able to identify Request for which the Response is replied. In the present embodiment, when transmitting the first measurement information together with the first X2 message, the eNB #1 stores a predetermined value (a sequence number) in the field "Sequence". When transmitting the second measurement information together with the second X2 message, the eNB #2 stores the predetermined value (the sequence number) in the field "Sequence".

The field "Original Timestamp" stores a time when the transmission source performs transmission. In the present embodiment, when transmitting the first measurement information together with the first X2 message, the eNB #1 stores a time at the time of the transmission in the field "Original Timestamp".

The field "Receive Timestamp" stores a time when the transmission destination performs reception. In the present embodiment, after the first measurement information is received together with the first X2 message, when transmitting the second measurement information together with the second X2 message, the eNB #2 stores a reception time of the first X2 message (the first measurement information) in the field "Receive Timestamp".

The field "Transmit Timestamp" stores a time when the transmission destination performs transmission. In the present embodiment, when transmitting the second measurement information together with the second X2 message, the eNB #2 stores a time at the time of the transmission in the field "Transmit Timestamp".

In addition, the formats of the field "Original Timestamp", the field "Receive Timestamp", and the field "Transmit Timestamp" may be UNIX (registered trademark) Echo Time or a GPS signal.

By subtracting (Receive Timestamp) from (Transmit Timestamp), it is possible to calculate a processing time in the transmission destination (the eNB #2). By subtracting (Original Timestamp) from (Transmit Timestamp), it is possible to measure communication delay also including network delay.

As described above, in the detail measurement mode, the first measurement information includes the transmission time of the first X2 message. The second measurement information includes the reception time of the first X2 message and the transmission time of the second X2 message.

For example, the eNB #1 calculates network delay from the eNB #1 to the eNB #2 from the transmission time of the first X2 message and the reception time of the first X2 message. The eNB #1 calculates processing delay in the eNB #2 from the reception time of the first X2 message and the transmission time of the second X2 message. The eNB #1 calculates network delay from the eNB #2 to the eNB #1 from the transmission time of the second X2 message and the reception time of the second X2 message.

(2.2) Format for Simple Measurement Mode

Figure 9:
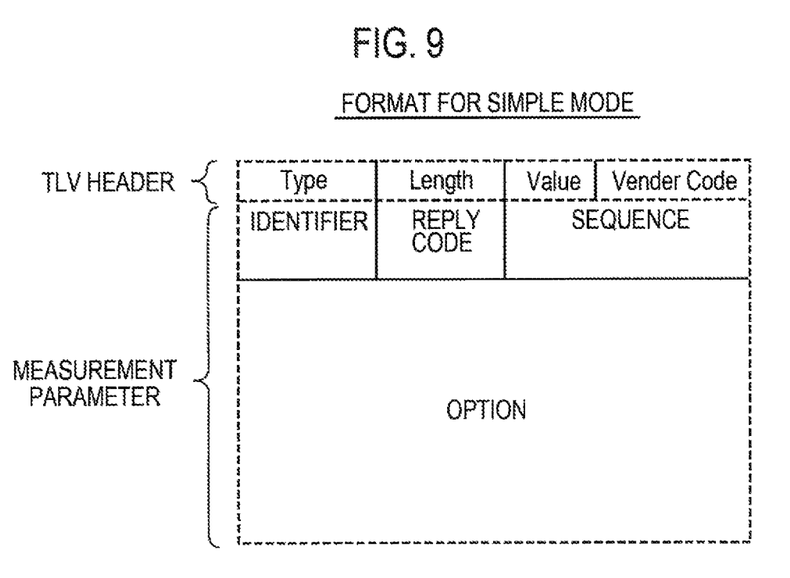
FIG. 9 is a format diagram of a format for a simple measurement mode according to the embodiment.

FIG. 9 is a format diagram of the format for the simple measurement mode.

As illustrated in FIG. 9, the format for the simple measurement mode has a field "Option" instead of the fields of the "Original Timestamp", the "Receive Timestamp", and the "Transmit Timestamp" in the format for the detail measurement mode.

The field "Option" stores a value of the transmission source. The transmission destination replies Response without a change. Since it is possible to freely change a packet Length, it is possible to measure delay associated with a data length. That is, the field "Option" is data (dummy data) having no special meaning. In the present embodiment, when transmitting the first measurement information together with the first X2 message, the eNB #1 stores dummy data having a data length determined by the eNB #1 in the field "Option". When transmitting the second measurement information together with the second X2 message, the eNB #2 stores data equal to the dummy data in the field "Option".

(2.3) Application Example of Each Measurement Mode

The detail measurement mode and the simple measurement mode, for example, may be separately used as follows.

For example, the eNB #1 selects the detail measurement mode or the simple measurement mode in response to the type of the first X2 message. For example, the eNB #1 applies the detail measurement mode to an X2 message determined in advance and applies the simple measurement mode to other X2 messages.

The eNB #1 basically may apply the simple measurement mode and switch the simple measurement mode to the detail measurement mode when communication delay measured in the simple measurement mode exceeds a threshold value.

Alternatively, the eNB #1 basically may apply the simple measurement mode and switch the simple measurement mode to the detail measurement mode when it is recognized that the accuracy of the time synchronization scheme of the eNB #2 is high in the simple measurement mode.

Alternatively, after applying the detail measurement mode in initial setting of the X2 interface, the eNB #1 applies the simple measurement mode during the operation of the X2 interface. In this way, network delay and processing delay measured in the detail measurement mode in the initial setting of the X2 interface can also be referred to later.

(3) Operation Example

Figure 10:
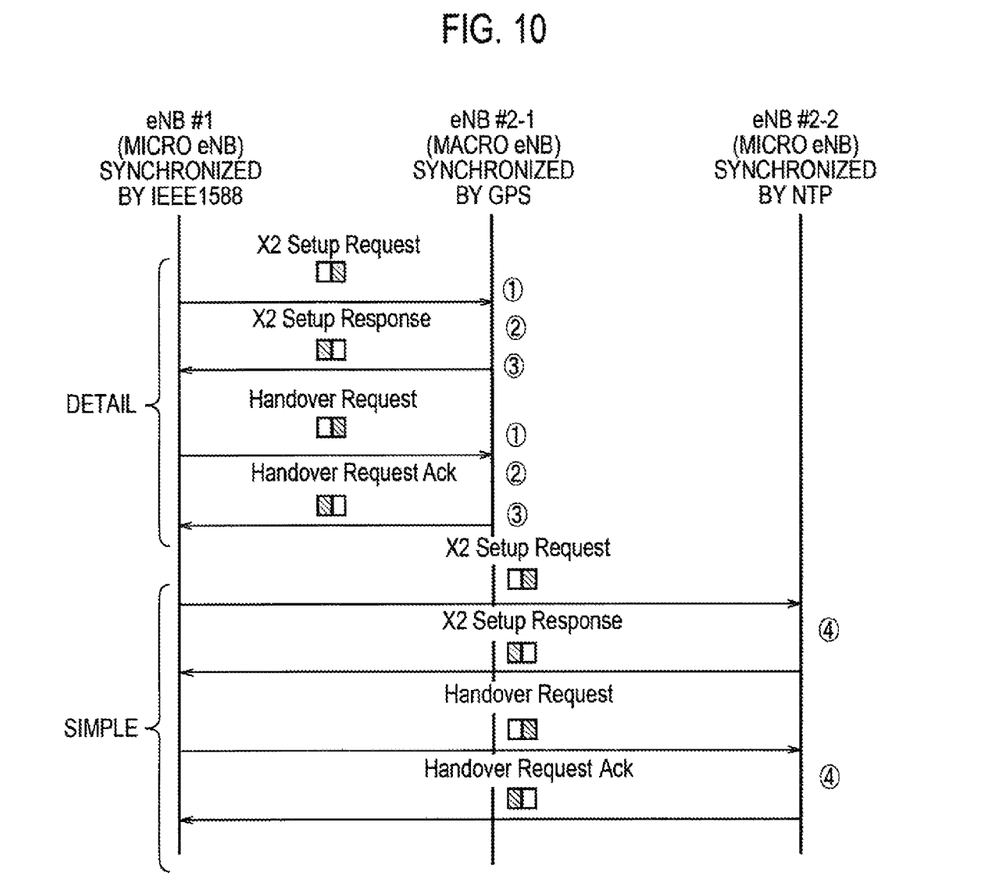
FIG. 10 is a sequence diagram of an operation example of the mobile communication system according to the embodiment.

Hereinafter, an operation example of the mobile communication system according to the present embodiment will be described. FIG. 10 is a sequence diagram of an operation example of the mobile communication system according to the present embodiment.

As illustrated in FIG. 10, the eNB #1 performs delay measurement by applying the detail measurement mode in an initial setup procedure of the X2 interface between the eNB #1 and eNB #2-1. Specifically, the eNB #1 adds the first measurement information to an X2 Setup request message for requesting the establishment of the X2 interface, and transmits the X2 Setup request message.

The eNB #2-1 adds the second measurement information to an X2 Setup response message for the X2 Setup request message, and transmits the X2 Setup response message. The Reply Code of the second measurement information stores a code indicating that "GPS is being used".

On the basis of the second measurement information added to a handover permission response (ACK) message, the eNB #1 measures the communication delay (the network delay and the processing delay). In addition, since the eNB #2-1 uses the GPS, the eNB #1 is able to regard that a result of the measurement is reliable.

Then, the eNB #1 performs delay measurement by applying the detail measurement mode in a handover procedure of UE from the eNB #1 to the eNB #2-1. Specifically, the eNB #1 adds the first measurement information to a handover request message for requesting the acceptance of the UE, and transmits the handover request message.

The eNB #2-1 adds the second measurement information to the handover permission response (ACK) message for the handover request message, and transmits the handover permission response (ACK) message. The Reply Code of the second measurement information stores a code indicating that "GPS is being used".

On the basis of the second measurement information added to a handover permission response (ACK) message, the eNB #1 measures the communication delay (the network delay and the processing delay).

Furthermore, the eNB #1 may compare the measured network delay and/or processing delay with a threshold value, and determine whether to continue or stop a subsequent handover procedure in response to a result of the comparison. Specifically, when the measured network delay and/or processing delay exceeds the threshold value, the eNB #1 stops the handover procedure.

Meanwhile, the eNB #1 applies the simple measurement mode to eNB #2-2 using a scheme (NTP) with low accuracy of time synchronization, and performs delay measurement.

(4) Conclusion of Embodiment

As described above, the eNB #1 adds the first measurement information for measuring the communication delay between the eNB #1 and the eNB #2 to the first X2 message, and transmits the first X2 message. In response to the reception of the first X2 message with the first measurement information, the eNB #2 adds the second measurement information for measuring the communication delay to the second X2 message, and transmits the second X2 message. After the second X2 message is received, the eNB #1 calculates the communication delay on the basis of the second measurement information added to the second X2 message.

In this way, the measurement information is transmitted and received as additional information of the X2 message, so that it is possible to measure the communication delay between the eNB #1 and the eNB #2 while making use of an existing protocol. Consequently, it is possible to improve the reliability of inter-eNB communication. Furthermore, as compared with the case of transmitting and receiving a message dedicated for measuring communication delay, it is possible to reduce overhead. Moreover, since the X2-AP is provided above the layer 3, it is possible to measure delay also including processing time (processing delay) in the upper layer.

In the present embodiment, in the detail measurement mode, the first measurement information includes the transmission time of the first X2 message, and the second measurement information includes the reception time of the first X2 message and the transmission time of the second X2 message. In the detail measurement mode, it is possible to measure the network delay between the eNB #1 and the eNB #2 and to further measure processing delay (that is, the processing capability of the eNB #2) in the eNB #2. Consequently, it is possible to designate whether the cause of occurrence of delay lies in the network or the eNB.

In the present embodiment, in the simple measurement mode, the first measurement information includes dummy data having a data length determined by the eNB #1, and the second measurement information includes data corresponding to the dummy data. In the simple measurement mode, it is possible to easily measure the communication delay (the round-trip time). Furthermore, it is possible to designate the data length of the dummy data, so that it is possible to measure the communication delay in association with the data length.

In the present embodiment, the eNB #1 selects the detail measurement mode or the simple measurement mode in response to the type of the first X2 message. In this way, it is possible to measure the communication delay with accuracy according to the type of the X2 message.

In the present embodiment, when the communication delay measured in the simple measurement mode exceeds a threshold value, the eNB #1 switches the simple measurement mode to the detail measurement mode. In this way, it is possible to normally apply the simple measurement mode, and to switch the simple measurement mode to the detail measurement mode in a situation in which it is possible to designate the cause of occurrence of delay.

In the present embodiment, after applying the detail measurement mode in the initial setup of the X2 interface, the eNB #1 applies the simple measurement mode during the operation of the X2 interface. In this way, the eNB #1 is able to recognize the network delay and the processing delay in detail measurement mode in the initial setup of the X2 interface, and to use values of the network delay and the processing delay later. Furthermore, during the operation thereof, when any failure occurs, it is possible to recognize the occurrence of the failure in the simple measurement mode.

In the present embodiment, the first X2 message is a request message for handover of a user terminal from the eNB #1 to the eNB #2, and the second X2 message is a response message for the request message. When the communication delay exceeds the threshold value, the eNB #1 stops the handover. In this way, it is possible to prematurely stop the handover in a situation under which it is not preferable to continue the handover procedure.

In the present embodiment, the first measurement information and/or the second measurement information includes information indicating a scheme of time synchronization in the transmission source eNB of the measurement information. In this way, for example, it is possible to perform an operation to apply the detail measurement mode to eNB with high accuracy of the time synchronization and to apply the simple measurement mode to eNB with low accuracy of the time synchronization. Alternatively, after recognizing the scheme of the time synchronization in the simple measurement mode, if the accuracy of the recognized scheme of the time synchronization is high, the detail measurement mode may be applied.

(5) Other Embodiments

It should not be understood that those descriptions and drawings constituting a part of the present disclosure limit the present invention. Further, various substitutions, examples, or operational techniques shall be apparent to a person skilled in the art on the basis of this disclosure.

For example, the aforementioned embodiment has mainly described the case of measuring the round-trip delay as the communication delay. However, as well as the case of measuring the round-trip delay, the present invention may be applied to the case of measuring one-way network delay.

Furthermore, the aforementioned embodiment has described the case of applying the present invention to the inter-eNB communication between the eNB #1 and the eNB #2 in the handover procedure. However, the present invention may be applied to communication between other eNBs. For example, the present invention can be applied to inter-eNB communication in cooperative communication (CoMP) between the eNB #1 and the eNB #2.

In the CoMP, an antenna group arranged in the same place is positioned as one "point" and a plurality of points communicate with the UE in cooperation with one another. A point group performing cooperative communication with the UE is called a CoMP cooperation set. When the point in the CoMP cooperation set is configured by eNB, high speed and stable inter-eNB communication is required.

Thus, when transmitting a request message for the CoMP to the eNB #2, the eNB #1 adds the first measurement information to the request message, and transmits the request message. When transmitting a permission response (ACK) message for the request message to the eNB #1, the eNB #2 adds the second measurement information to the permission response (ACK) message, and transmits the permission response (ACK) message. The eNB #1 calculates communication delay on the basis of the second measurement information, and compares the communication delay with a threshold value. When the communication delay exceeds the threshold value, the eNB #1 stops the CoMP with the eNB #2. In this way, it is possible to prematurely stop the CoMP in a situation under which it is not preferable to continue the CoMP.

Furthermore, the aforementioned embodiment is based on the assumption that base stations are time-synchronous. However, it is also considered that the base stations include a base station that is not time-synchronous with another base station. The base station not time-synchronous with the other base station, for example, includes a home-use base station (a Femto base station or Home eNB (HeNB)). Thus, in such a case, for example, when a macro eNB (or micro eNB) is able to recognize in advance the home-use base station as abase station with which time synchronization is established, only the simple measurement mode may be applied as a measurement mode for the home-use base station.

Furthermore, the first X2 message and the second X2 message used in the present embodiment may be an existing message already defined in 3GPP standard, or a new message dedicated for delay measurement instead of the existing message.

In addition, the entire content of U.S. Provisional Application No. 61/614,300 (filed on Mar. 22, 2012) is incorporated in the present specification by reference.

INDUSTRIAL APPLICABILITY

As described above, the present invention is useful in a radio communication field

The invention claimed is:

1. A communication control method that is applied to a mobile communication system including an X2 interface, the communication control method comprising:
 a step A of transmitting, by a first base station, a first X2 message to a second base station through an X2 interface established between the first base station and the second base station, wherein
 in the step A, the first base station adds first measurement information for measuring communication delay between the first base station and the second base station to the first X2message, and transmits the first X2 message, and
 the first measurement information includes information indicating a request of a measurement parameter for calculating the communication delay.

2. The communication control method according to claim 1, further comprising:
 a step B of transmitting, by the second base station, a second X2 message to the first base station through the X2 interface in response to reception of the first X2 message, wherein
 in the step B, on the basis of the first measurement information included in the first X2 message, the second base station adds second measurement information for measuring the communication delay to the second X2 message, and transmits the second X2 message.

3. The communication control method according to claim 2, further comprising: a step C of receiving, by the first base station, the second X2 message, and calculating the communication delay on the basis of the received second measurement information added to the second X2 message.

4. The communication control method according to claim 2, wherein the first measurement information and/or the second measurement information includes information indicating a scheme of time synchronization in a transmission source base station.

5. The communication control method according to claim 2, wherein
 in a first measurement mode, the first measurement information includes a transmission time of the first X2 message, and
 in the first measurement mode, the second measurement information includes a reception time of the first X2 message and a transmission time of the second X2 message.

6. The communication control method according to claim 5, wherein
 in a second measurement mode, the first measurement information includes dummy data having a data length determined by the first base station, and
 in the second measurement mode, the second measurement information includes data corresponding to the dummy data.

7. The communication control method according to claim 6, further comprising: a step D of selecting, by the first base station, the first measurement mode or the second measurement mode in response to a type of the first X2 message.

8. The communication control method according to claim 6, further comprising: a step E of switching, by the first base station, to the first measurement mode when the communication delay calculated in the step C exceeds a threshold value in the second measurement mode.

9. The communication control method according to claim 6, further comprising: a step F of applying, by the first base station, the second measurement mode during an operation of the X2 interface after applying the first measurement mode in initial setup of the X2 interface.

10. The communication control method according to claim 3, wherein
 the first X2 message is a request message for handover of a user terminal from the first base station to the second base station,
 the second X2 message is a response message for the request message, and
 the communication control method further comprises: a step G of stopping, by the first base station, the handover when the communication delay calculated in the step C exceeds a threshold value.

11. The communication control method according to claim 3, wherein
 the first X2 message is a request message for cooperative communication between the first base station and the second base station,
 the second X2 message is a response message for the request message, and the communication control method further comprises: a step H of stopping, by the first base station, the cooperative communication when the communication delay calculated in the step C exceeds a threshold value.

12. A base station that has an X2 interface established between the base station and another base station, comprising:
 a transmission unit that transmits a first X2 message to the other base station through the X2 interface, wherein
 the transmission unit adds first measurement information for measuring communication delay between a first base station and a second base station to the first X2 message, and transmits the first X2 message, and
 the first measurement information includes information indicating a request of a measurement parameter for calculating the communication delay.

13. A base station that has an X2 interface established between the base station and another base station, wherein when receiving a first X2 message to which first measurement information is added from the other base station through the X2 interface, the base station adds second measurement information to a second X2 message and transmits the second X2 message, on the basis of the first measurement information, wherein
 the first measurement information and the second measurement information are information for measuring communication delay between the base station and the other base station, and
 the first measurement information includes information indicating a request of a measurement parameter for calculating the communication delay.

14. The communication control method according to claim 1, wherein
 the measurement parameter includes at least one of a time, at which the second base station transmitted acknowledgement in response to the first X2 message, and a time at which the second base station received the first X2 message.

15. The base station according to claim 12, wherein the measurement parameter includes at least one of a time, at which the second base station transmitted acknowledgement in response to the first X2 message, and a time at which the second base station received the first X2 message.

16. The base station according to claim 13, wherein the measurement parameter includes at least one of a time, at which the base station transmitted the second X2 message, and a time at which the base station received the first X2 message.

* * * * *